(12) United States Patent
Andrews et al.

(10) Patent No.: US 7,636,351 B2
(45) Date of Patent: Dec. 22, 2009

(54) METHODS, SYSTEMS, AND STORAGE MEDIUMS FOR PROVIDING DATABASE MANAGEMENT SERVICES FOR A TELECOMMUNICATIONS SYSTEM

(75) Inventors: Elisa Andrews, Hoover, AL (US); Cynthia Hoffner, Charlotte, NC (US); Stanley Greenstein, Lawrenceville, GA (US)

(73) Assignee: AT&T Intellectual Property, I, L.P., Wilmington, DE (US)

( * ) Notice: Subject to any disclaimer, the term of this patent is extended or adjusted under 35 U.S.C. 154(b) by 1054 days.

(21) Appl. No.: 10/770,262

(22) Filed: Feb. 2, 2004

(65) Prior Publication Data
US 2005/0169260 A1   Aug. 4, 2005

(51) Int. Cl.
H04L 12/28 (2006.01)
H04L 12/56 (2006.01)
G06F 15/173 (2006.01)
(52) U.S. Cl. .................. 370/389; 370/420; 709/223
(58) Field of Classification Search ............. 370/389; 709/223
See application file for complete search history.

(56) References Cited

U.S. PATENT DOCUMENTS

| | | | | |
|---|---|---|---|---|
| 5,784,560 A * | 7/1998 | Kingdon et al. | .......... | 709/201 |
| 5,920,846 A * | 7/1999 | Storch et al. | .......... | 705/7 |
| 5,974,127 A * | 10/1999 | Wernli et al. | .......... | 379/201.01 |
| 6,256,773 B1 * | 7/2001 | Bowman-Amuah | .......... | 717/121 |
| 6,289,382 B1 * | 9/2001 | Bowman-Amuah | .......... | 709/226 |
| 6,356,285 B1 * | 3/2002 | Burkwald et al. | .......... | 715/853 |
| 6,374,208 B1 * | 4/2002 | Ferris et al. | .......... | 703/27 |
| 6,380,924 B1 * | 4/2002 | Yee et al. | .......... | 345/156 |
| 6,519,603 B1 * | 2/2003 | Bays et al. | .......... | 707/102 |
| 6,523,072 B1 * | 2/2003 | Howarth et al. | .......... | 710/33 |
| 6,661,885 B1 * | 12/2003 | McCurdy et al. | .......... | 379/201.12 |
| 6,772,131 B1 * | 8/2004 | Francis et al. | .......... | 705/35 |
| 6,904,110 B2 * | 6/2005 | Trans et al. | .......... | 375/350 |
| 7,277,882 B1 * | 10/2007 | Walters et al. | .......... | 707/3 |
| 2001/0016843 A1 * | 8/2001 | Olson et al. | .......... | 707/3 |
| 2001/0034679 A1 * | 10/2001 | Wrigley | .......... | 705/35 |
| 2001/0037296 A1 * | 11/2001 | Ganesan et al. | .......... | 705/40 |
| 2002/0029250 A1 * | 3/2002 | Reiner | .......... | 709/206 |

(Continued)

OTHER PUBLICATIONS

Author: IBM Technical Disclosure Bulletin, Grams, GL ; Title: Data Conversion Toolkit; Date: Nov. 1, 1995; vol. 38; Issue: 11; pp. 477-480.*

*Primary Examiner*—Ario Etienne
*Assistant Examiner*—Tariq S Najee-Ullah
(74) *Attorney, Agent, or Firm*—Cantor Colburn LLP (57) ABSTRACT

Embodiments relate to a method, system, and storage medium for providing database management services for a telecommunications system. The method includes extracting a first set of raw data from a legacy system relating to telecommunications transmission lines via a first routine of a network planning application. The method further includes extracting a second set of raw data from the legacy system relating to telecommunications equipment via a second routine of a network planning application. The method also includes extracting a third set of raw data from the legacy system relating to telecommunications wavelength division multiplexing data via a third routine of the network planning application. The method also includes generating a first spreadsheet file comprising data selected and combined by the first spreadsheet application macro. Utilizing a managed language application, the third set of raw data is also used by a second application macro to create a second spreadsheet application.

15 Claims, 13 Drawing Sheets

U.S. PATENT DOCUMENTS

| | | | |
|---|---|---|---|
| 2002/0063924 A1* | 5/2002 | Kimbrough et al. | 359/125 |
| 2002/0069400 A1* | 6/2002 | Miloushev et al. | 717/108 |
| 2002/0073342 A1* | 6/2002 | Challener et al. | 713/202 |
| 2002/0184170 A1* | 12/2002 | Gilbert et al. | 706/20 |
| 2003/0016770 A1* | 1/2003 | Trans et al. | 375/346 |
| 2003/0061068 A1* | 3/2003 | Curtis | 705/1 |
| 2003/0069994 A1* | 4/2003 | Herceg et al. | 709/246 |
| 2004/0060056 A1* | 3/2004 | Wellons et al. | 719/317 |
| 2005/0058149 A1* | 3/2005 | Howe | 370/428 |
| 2005/0102310 A1* | 5/2005 | Marr et al. | 707/102 |
| 2005/0149372 A1* | 7/2005 | Kite et al. | 705/8 |
| 2005/0216380 A1* | 9/2005 | Morris et al. | 705/34 |
| 2006/0173777 A1* | 8/2006 | Torres et al. | 705/40 |

* cited by examiner

| CLLI6 | DISTRICT |
|---|---|
| ABRDMS | MS – North |
| ABVLLA | LA – North/Central |
| ACHLTN | TN – Middle |
| ACKRMS | MS – North |
| ACMENC | NC – East |
| ACWOGA | GA – North West |
| ADRNGA | GA – East |
| ADVLTN | TN – West (Jackson) |
| AGSTGA | GA – East |
| AHVLNC | NC – Southwest |
| AIKNSC | SC – Lowcountry/Midlands |
| AIVLGA | GA – West |
| ALAMTN | TN – West (Jackson) |
| ALBSAL | AL – North |
| ALBYGA | GA – West |
| ALBYLA | LA – South |
| ALCHFL | FL – Central |
| ALCOTN | TN – East |
| ALCYAL | GULF |
| ALDLSC | SC – Lowcountry/Midlands |
| ALLNKY | KY – East |
| ALMAGA | GA – East |
| ALMDLA | LA – South |
| ALPRGA | GA – North East |
| ALPSGA | GA – North West |
| ALSPFL | FL – Central |
| ALVLAL | AL – North |
| ALXNLA | LA – North/Central |
| AMITLA | LA – South |
| AMRCGA | GA – West |
| AMRYMS | MS – North |
| ANGILA | LA – South |
| ANTCTN | TN – Middle |
| ANTNAL | AL – North |
| ANVLGA | GA – West |
| APEXNC | NC – East |
| APNGGA | GA – East |
| ARABAL | AL – North |
| ARCDLA | LA – North/Central |
| ARDNNC | NC – Southwest |
| ARNYAL | AL – North |
| ARSNNC | NC – Central |
| ARSNSC | SC – Upstate |
| ARTNGA | GA – West |
| ARTNKY | KY – West |
| ARTNTN | TN – West (Memphis) |
| ASCYTN | TN – Middle |
| ASKWMS | MS – North |
| ASLDAL | GULF |
| ASLDMS | MS – North |
| ASTLGA | GA – North West |
| ATHNAL | AL – North |
| ATHNGA | GA – East |
| ATHNLA | LA – North/Central |
| ATHNTN | TN – East |
| ATLAGA | GA – Central |
| ATLAGA | |
| ATLBGA | GA – Central |
| ATLCGA | GA – Central |
| ATLDGA | GA – Central |
| ATLMGA | GA – Central |
| ATLNGA | GA – Central |
| ATLSFL | FL – Palm |
| ATMRAL | GULF |

*FIG. 3*

| WDM Sys # | WDM Type | WDM A Loc | WDM Z Loc | Unit # | Sys # | Rate | A CLLI | Z CLLI | CAC | SCID |
|---|---|---|---|---|---|---|---|---|---|---|
| 182G | WDM | ACWOGAMA | CRVLGAMA | | 182G | OC48 | ACWOGAMA | CRVLGAMA | CSA2BK7 | NG182G |
| 627R | WDM | ACWOGAMA | MRTTGAMA | | 627R | OC48 | ACWOGAMA | MRTTGAMA | CRT2CZ7 | NG627R |
| 200R | WDM | ACWOGAMA | WDSTGACR | | 200R | OC48 | ACWOGAMA | WDSTGACR | CQW2XS4 | NG200R |
| 308G | WDM | ACWOGAMA | WDSTGACR | | | | | | | |
| 383R | WDM | ACWOGAMA | WDSTGACR | | 383R | OC48 | ACWOGAMA | WDSTGACR | CRN2GP6 | NG383R |
| 627 | WDM | ACWOGAMA | WDSTGACR | | 627R | OC48 | ACWOGAMA | WDSTGACR | CRT2CZ2 | NG627R |
| 159G | WDM | AGSTGAAU | AGSTGAMT | | 159G | OC12 | AGSTGAAU | AGSTGAMT | CSJ2MN9 | NG159G |
| 372G | WDM | AGSTGAAU | AGSTGAMT | | 372G | OC03 | AGSTGAAU | AGSTGAMT | CRL2UR3 | NG372G |
| 380G | WDM | AGSTGAAU | AGSTGAMT | | 380G | OC12 | AGSTGAAU | AGSTGAMT | CSJ2VK2 | NG380G |
| 443G | WDM | AGSTGAAU | AGSTGAMT | | 443G | OC03 | AGSTGAAU | AGSTGAMT | CSN2AR2 | NG443G |
| 534R | WDM | AGSTGAAU | AGSTGAMT | | 534R | OC48 | AGSTGAAU | AGSTGAMT | CQV2ER6 | NG534R |
| 537 | WDM | AGSTGAAU | AGSTGAMT | | 537R | OC48 | AGSTGAAU | AGSTGAMT | CRM2GN2 | NG537R |
| 541 | WDM | AGSTGAAU | AGSTGAMT | | 541R | OC48 | AGSTGAAU | AGSTGAMT | CRN2UE6 | NG541R |
| 560 | WDM | AGSTGAAU | AGSTGAMT | | 560R | OC48 | AGSTGAAU | AGSTGAMT | CRS2CE3 | NG560R |
| 443G | WDM | AGSTGAAU | AGSTGAPN | | 443G | OC03 | AGSTGAAU | AGSTGAPNH01 | CSN2AR9 | NG443G |
| 372G | WDM | AGSTGAAU | AGSTGAPOH01 | | 372G | OC12 | AGSTGAAU | AGSTGAPOH01 | CRM2GC7 | NG372G |
| 159G | WDM | AGSTGAAU | AGSTGATH | | 159G | OC12 | AGSTGAAU | AGSTGATH | CSJ2NA3 | NG159G |
| 665 | WDM | AGSTGAEF1MD | AGSTGAMT | | 665G | OC12 | AGSTGAEF1MD | AGSTGAMTHB1 | CSJ2ZV8 | NG665G |
| 665G | WDM | AGSTGAEF1MD | AGSTGAMT | | 665G | OC12 | AGSTGAEF1MD | AGSTGAMT | CSK2AB9 | NG665G |
| FC03 | WDM | AGSTGAFL | AGSTGAMT | | 911 | OC48 | AGSTGAFLHS1 | AGSTGAMTHS1 | CRY2BK9 | NBFC03 |
| 537 | WDM | AGSTGAFL | AGSTGAMT | | 537R | OC48 | AGSTGAFL | AGSTGAMT | CRM2GP9 | NG537R |
| 541 | WDM | AGSTGAFL | AGSTGAMT | | 541R | OC12 | AGSTGAFL | AGSTGAMT | CRN2UE7 | NG541R |
| 160 | WDM | AGSTGAFL | ACSTGATRCM1 | | 160 | OC12 | AGSTGAFL | AGSTGATRCM1 | CRW2LS5 | NG160R |
| 160R | WDM | AGSTGAFL | AGSTGATRCM1 | | 160R | OC12 | AGSTGAFL | AGSTGATRCM1 | CRW2LS6 | NG160R |
| 0340 | OMC16 | AGSTGAFL | WYBOGAES | | | | | | | |
| 320 | WDM | AGSTGAJJ3MD | AGSTGAMT | | 320E | OC48 | AGSTGAJJ3MD | AGSTGAMT | CQW2DI3 | NG320R |
| 372G | WDM | AGSTGAMT | AGSTGAPOH01 | | 372G | OC03 | AGSTGAMT | AGSTGAPOH01 | CRM2GC9 | NG372G |
| 001D | OMC16 | AGSTGAMT | ATLNGAEL | 1-1-1 | 911 | OC48BB | ATLNGAELHS1 | ATLNGAELHS1 | CRY2AF9 | NBFG03 |
| 742 | WDM | AGSTGAMT | HPH2CAES | 5-1-1 | 905 | OC48 | AGSTGAMT | WYBOGAES | CRG2UF8 | NBGSN2 |
| 101 | OMC16 | AGSTGAMTHS1 | CLMASCSWHS1 | 3-1-1 | 910 | OC48 | AGSTGAMTHS1 | CLMASCSNHS1 | CQS2N15 | NBGA01 |
| 001D | OMC16 | AGSTGAMT | ATLNGAEL | 7-1-1 | 901 | OC48 | AGSTGAMTHS1 | ATLNGAELHS1 | CPP2NQ3 | NBGS01 |
| 001D | OMC16 | AGSTGAMT | ATLNGAEL | 9-1-1 | 907 | OC48 | AGSTGAMTHS1 | ATLNGAELHS1 | CQA2YU9 | NBFG02 |
| 001D | OMC16 | AGSTGAMTHS1 | ATLNGAEL | 13-1-1 | 01 | OC48BB | ATLNGAELBBE | CHRLNCJNA02 | CSF2YY7 | 01/OC48BB/ATLNGAELB BE/CHRLNCUNA02 |
| 001D | WDM | AGSTGAMT | ATLNGAEL | 15-1-1 | 02 | OC48BB | AGSTGAFLBBE | ATLNGAELBBE | CSJ2YW7 | 02/OC48BB/AGSTGAFLB BE/ATLNGAELBBE |
| 742 | WDM | AGSTGAMT | HPH2CAES | | 742R | OC48 | AGSTGAMT | WYBOGAES | CRV2QF8 | NG742R |
| 101 | OMC16 | AGSTGAMTHS1 | CLMASCSWHS1 | | 906 | OC48 | AGSTGAMTHS1 | CLMASCSNHS1 | CRH2SX3 | NBGSN2 |
| 101 | OMC16 | AGSTGAMTHS1 | CLMASCSWHS1 | 9-1-1 | 01 | OC48BB | ATLNGAELBBE | CHRLNCJNA02 | CSF2YY7 | 01/OC48BB/ATLNGAELB BE/CHRLNCUNA02 |
| 101 | OMC16 | AGSTGAMTHS1 | CLMASCSWHS1 | 11-1-1 | 02 | OC48BB | AGSTGAFLBBE | CLMASCARBBZ | CSJ2YB9 | 02/OC48BB/AGSTGAFLB BE/CLMASCARBBZ |

*FIG. 4*

| SCID | FAC_DES | FAC_TYPE | SUBP_A_LOC | SUBP_Z_LOC | DUE_DATE | CUSTOMER |
|---|---|---|---|---|---|---|
| N00002 | 101 | OC03 | HCRDTNXA | KNVLTNFC | 20020912 | |
| N00002 | 102 | OC03 | HCRDTNXA | KNVLTNFC | 20020823 | |
| N00002 | 102 | OC03 | HCRDTNXA | KNVLTNFC | 20020912 | |
| N00002 | 102 | OC03 | HCRDTNXA | KNVLTNFC | 20020912 | |
| N00003 | 101 | OC03 | BLGPTNMA | MRTWTNMA | 19930324 | SONET |
| N00004 | 101 | OC03 | ETRGTNXA | LRBGTNMA | 19921113 | |
| N00005 | 101 | OC03 | BWLGKYMA | HRCVKYXA | 19930111 | |
| N00009 | 101 | OC03 | MAVLTNMA | TWNSTNMA | 19930401 | SONET |
| N00020 | 101 | OC03 | MMVLTNXA | MNCHTNMA | 19931022 | |
| N00023 | 101 | OC03 | LBNNTNMA | WTTWTNMA | 19940202 | |
| N00024 | 101 | OC03 | FRVWTNMT | NSVLTNBV | 19940310 | |
| N00101 | 101 | OC03 | LSVLKYOA | ZNTNKYXA | 19921113 | |
| N00103 | 101 | OC03 | LSVLKYAP | LSVLKY4OBMD | 19920715 | |
| N00105 | 101 | OC03 | LSVLKYJT | LSVLKYWXCM1 | 19920728 | |
| N00107 | 101 | OC03 | LSVLKYFC | MTWSKYXA | 19950117 | |
| N00125 | 106 | OC48 | LSVLKYAP | LSVLKY26 | 19950301 | |
| N00125 | 101 | OC48 | LSVLKYAP | LSVLKY29AMD | 19940711 | |
| N00125 | 101 | OC48 | LSVLKY26 | LSVLKY29AMD | 19950302 | |
| N00126 | 105 | OC48 | LSVLKYAP | LSVLKY26 | 19950217 | |
| N00126 | 101 | OC48 | LSVLKYAP | LSVLKY27AMD | 20030507 | BST/INTERNET/SERVICE |
| N00126 | 101 | OC48 | LSVLKY26 | LSVLKY27AMD | 19950217 | |
| N00127 | 101 | OC12 | LSVLKYOA | LSVLKY89 | 19960805 | |
| N00201 | 101 | OC03 | HRLDKYXE | PKVLKYMA | 19981207 | |
| N00201 | 102 | OC03 | HRLDKYXE | PKVLKYMA | 19981207 | |
| N02T09 | 3001 | OC03 | WWSPFLCL1MD | WWSPFLSH | 19920710 | |
| N1110B | 2001 | OC03 | CHRLNCCA | CHRLNCNBH02 | 19960723 | |
| N1110C | 2011 | OC03 | CHRLNCCA | CHRLNCNBH03 | 19960723 | |
| N1110D | 2021 | OC03 | CHRLNCCA | CHRLNCNBH04 | 19960723 | |
| N1110E | 2031 | OC03 | CHRLNCCA | CHRLNCNBH05 | 19960723 | |
| N1110F | 2041 | OC03 | CHRLNCCA | CHRLNCNBH06 | 19960723 | |
| N1110H | 2061 | OC03 | CHRLNCCA | CHRLNCNBH08 | 19960721 | |
| N2001P | 2001 | OC03 | ATLNGACS | ATLNGAPP | 19940421 | |
| N2001P | 2001 | OC03 | ATLNGACS | ATLNGAU1135 | 19940421 | |
| N2001P | 2001 | OC03 | ATLNGAPP | ATLNGARQHO1 | 19940421 | |
| N2001P | 2001 | OC03 | ATLNGARQHO1 | ATLNGAU1144 | 19940421 | |
| N2001P | 2001 | OC03 | ATLNGAU1135 | ATLNGAVWH01 | 19940421 | |
| N2001P | 2001 | OC03 | ATLNGAU1144 | ATLNGA51H01 | 19940421 | |
| N2001P | 2001 | OC03 | ATLNGAVWH01 | ATLNGA51H01 | 19940421 | |
| N2004P | 2004 | OC03 | ATLNGACS | ATLNGAPP | 19940314 | |
| N2004P | 2004 | OC03 | ATLNGACS | ATLNGAU1176 | 19940314 | |
| N2004P | 2004 | OC03 | ATLNGAIFHO1 | ATLNGAPP | 19940314 | |
| N2004P | 2004 | OC03 | ATLNGAIFHO1 | ATLNGAU1106 | 19950925 | |
| N2004P | 2004 | OC03 | ATLNGAU1106 | ATLNGAU1176 | 19950925 | |
| N2005P | 2005 | OC12 | ATLNGACS | ATLNGACS | 19960405 | |
| N2005P | 2005 | OC12 | ATLNGACS | ATLNGAPP | 19960405 | |
| N2005P | 2005 | OC12 | ATLNGACS | ATLNGAU1008 | 19960405 | |
| N2005P | 2005 | OC12 | ATLNGAPP | ATLNGAPP | 19960405 | |
| N2005P | 2005 | OC12 | ATLNGAPP | ATLNGAU1157 | 19960405 | |
| N2005P | 2005 | OC12 | ATLNGAU1008 | ATLNGAU1008 | 19960405 | |
| N2005P | 2005R | OC12 | ATLNGAU1008 | ATLNGAU1157 | 19980401 | |
| N2005P | 2005 | OC12 | ATLNGAU1157 | ATLNGAU1157 | 19980401 | |
| N2006P | 2006 | OC03 | ATLNGACS | ATLNGAPP | 19940225 | |
| N2006P | 2006 | OC03 | ATLNGACS | ATLNGAU1074 | 19940310 | |
| N2006P | 2006 | OC03 | ATLNGAPP | ATLNGAU1080 | 19940310 | |
| N2006P | 2006 | OC03 | ATLNGAU1074 | ATLNGAU1080 | 19940309 | |
| N2007P | 2007 | OC03 | ATLNGACS | ATLNGAPP | 19940414 | |
| N2007P | 2007 | OC03 | ATLNGACS | ATLNGAU1054 | 19950926 | |
| N2007P | 2007 | OC03 | ATLNGAMYH01 | ATLNGAU1054 | 19981008 | |

*FIG. 5*

| WDM Type | WDM Sys # | WDM A Loc | WDM Z Loc | Wkg Ch | Spare Ch | State |
|---|---|---|---|---|---|---|
| OM02 | 101 | ARCDLABW | CASTLAMA | 2 | 0 | LA |
| OM02 | 101 | BILXMSDI | GLPTMSLY | 2 | 0 | MS |
| OM02 | 101 | BILXMSU7156 | GLPTMSLY | 2 | 0 | MS |
| OM02 | 101 | BNITMSMA | GNVLMSMA | 2 | 0 | MS |
| OM02 | 101 | BRHNMSMA | WSSNMSMA | 2 | 0 | MS |
| OM02 | 101 | CLEVMSMA | PACEMSMA | 2 | 0 | MS |
| OM02 | 101 | CLEVMSMA | RLVLMSMA | 1 | 1 | MS |
| OM02 | 101 | CLMALAMA | GRTWLAMA | 2 | 0 | LA |
| OM02 | 101 | CLMALAMA | MONRLAMA | 2 | 0 | LA |
| OM02 | 101 | CRSPMSMA | HZLHMSMA | 2 | 0 | MS |
| OM02 | 101 | CRVLTNMA | MSCWTNMA | 2 | 0 | TN |
| OM02 | 101 | FYTTMSMA | NTCHMSMA | 1 | 1 | MS |
| OM02 | 101 | FYTTMSMA | PGSNMSMA | 1 | 1 | MS |
| OM02 | 101 | GDJTTNMA | MSCWTNMA | 2 | 0 | TN |
| OM02 | 101 | GNVLSCCR | GNVLSCDT | 2 | 0 | SC |
| OM02 | 101 | HZLHMSMA | WSSNMSMA | 2 | 0 | MS |
| OM02 | 101 | MACNMSMA | SHQLMSMA | 1 | 1 | MS |
| OM02 | 101 | MINDLAMA | SHPTLAMA | 2 | 0 | LA |
| OM02 | 101 | MMPHTNCT | MMPHTN32WA1 | 2 | 0 | TN |
| OM02 | 101 | MMPHTNEL | MMPHTNLCH06 | 1 | 1 | TN |
| OM02 | 101 | MMPHTNERH02 | MMPHTNMAWD2 | 2 | 0 | TN |
| OM02 | 101 | MMPHTNMAWD2 | MMPHTNRVH01 | 2 | 0 | TN |
| OM02 | 101 | MMPHTNMAWD2 | MMPHTNTBH01 | 2 | 0 | TN |
| OM02 | 101 | MONRLAMA | RSTNLAMA | 2 | 0 | LA |
| OM02 | 101 | MSTFMSCU | PCYNMSMA | 2 | 0 | MS |
| OM02 | 101 | NSVLTNMT | NSVLTN1W100 | 2 | 0 | TN |
| OM02 | 101 | NSVLTNMT | NSVMTNHDH00 | 2 | 0 | TN |
| OM02 | 101 | NSVLTNMTVS1 | NSVLTNSPH01 | 2 | 0 | TN |
| OM02 | 101 | NSVLTNMTVS1 | NSVMTNHDH00 | 1 | 1 | TN |
| OM02 | 101 | PACEMSMA | RSDLMSMA | 2 | 0 | MS |
| OM02 | 101 | VADNMSMA | WESTMSMA | 2 | 0 | MS |
| OM02 | 102 | ARCDLABW | CASTLAMA | 2 | 0 | LA |
| OM02 | 102 | BILXMSDI | GLPTMSLY | 2 | 0 | MS |
| OM02 | 102 | BNITMSMA | GNVLMSMA | 2 | 0 | MS |
| OM02 | 102 | BRHNMSMA | WSSNMSMA | 1 | 1 | MS |
| OM02 | 102 | CLEVMSMA | PACEMSMA | 2 | 0 | MS |
| OM02 | 102 | CLEVMSMA | RLVLMSMA | 1 | 1 | MS |
| OM02 | 102 | CLMALAMA | GRTWLAMA | 2 | 0 | LA |
| OM02 | 102 | CLMALAMA | MONRLAMA | 2 | 0 | LA |
| OM02 | 102 | CRSPMSMA | HZLHMSMA | 1 | 1 | MS |
| OM02 | 102 | CRVLTNMA | MSCWTNMA | 2 | 0 | TN |
| OM02 | 102 | FYTTMSMA | NTCHMSMA | 1 | 1 | MS |
| OM02 | 102 | FYTTMSMA | PGSNMSMA | 1 | 1 | MS |
| OM02 | 102 | GDJTTNMA | MSCWTNMA | 2 | 0 | TN |
| OM02 | 102 | GNVLSCCR | GNVLSCDT | 2 | 0 | SC |
| OM02 | 102 | HZLHMSMA | WSSNMSMA | 2 | 0 | MS |
| OM02 | 102 | MACNMSMA | SHQLMSMA | 1 | 1 | MS |
| OM02 | 102 | MINDLAMA | SHPTLAMA | 2 | 0 | LA |
| OM02 | 102 | MMPHTNCT | MMPHTN32WA1 | 2 | 0 | TN |
| OM02 | 102 | MMPHTNEL | MMPHTNLCH06 | 1 | 1 | TN |
| OM02 | 102 | MONRLAMA | RSTNLAMA | 2 | 0 | LA |
| OM02 | 102 | MSTFMSCU | PCYNMSMA | 2 | 0 | MS |
| OM02 | 102 | PACEMSMA | RSDLMSMA | 2 | 0 | MS |
| OM02 | 102 | VADNMSMA | WESTMSMA | 2 | 0 | MS |
| OM02 | 103 | BNITMSMA | GNVLMSMA | 1 | 1 | MS |
| OM02 | 103 | CLEVMSMA | PACEMSMA | 2 | 0 | MS |
| OM02 | 103 | MMPHTNCT | MMPHTN32WA1 | 2 | 0 | TN |
| OM02 | 103 | MMPHTNLCH01 | MMPHTNLCH06 | 1 | 1 | TN |

*FIG. 6*

THRESHOLD FIBER COMPARISON

PRINTED: 8/1/2003  DATA EXTRACTED 7/16/2003  DISTRICT: EAST
Area: WLMG

| FIBER ALOC | FIBER ZLOC | CABLE # | LOW | HIGH | SPARE | SPARE THRESHOLD | THRESHOLD EXCEEDED? | FIX |
|---|---|---|---|---|---|---|---|---|
| ACMENCMA | | | | | | | | |
| | ATSNNCMA | F3032 | 1 | 18 | 10 | 10 | No | S |
| | BOTNNCMAH01 | F3067 | 1 | 36 | 20 | 20 | No | S |
| | WLMGNCLE | F3017 | 1 | 12 | 6 | 6 | No | S |
| | WLMGNCLE | F3073 | 1 | 36 | 16 | 16 | No | S |
| ATSNNCMA | | | | | | | | |
| | BRGWNCMA | F3028 | 1 | 24 | 12 | 12 | No | S |
| | LMTNNCMA | F3077 | 1 | 36 | 30 | 30 | No | S |
| BOLVNCXA | | | | | | | | |
| | WLMGNCLE | F3026 | 1 | 6 | 2 | 2 | Yes | S |
| BOTNNCMA | | | | | | | | |
| | CKTNNCU0 | F3011 | 1 | 6 | 2 | 2 | DWDM HAS BEEN PLACED | D |
| BOTNNCMAH01 | | | | | | | | |
| | SPLYNCAA | F3071 | 1 | 18 | 12 | 12 | Yes | S |
| | SPLYNCXA | F3070 | 1 | 6 | 2 | 2 | No | S |
| BRGWNCMA | | | | | | | | |
| | CSHYNCMA | F3022 | 1 | 12 | 6 | 6 | Yes | S |
| | CSHYNCMA | F3078 | 1 | 48 | 40 | 40 | No | S |
| | KNVLNCES | F3020 | 1 | 12 | 6 | 6 | No | S |
| CKTNNCU0 | | | | | | | | |
| | LMTNNCMA | F3012 | | | | | DWDM HAS BEEN PLACED | |

| Fib ALoc | Fib ZLoc | Cable # | Low | High | Fiber # | WDM Ch # | RST | Status Now | Status Pend | sys id | type | Sys ALoc | Sys ZLoc | In Svc | SCID | Year |
|---|---|---|---|---|---|---|---|---|---|---|---|---|---|---|---|---|
| ALLNKYMA | ALLNKY00CM1 | K716A | 1 | 12 | 00001 |  |  | S | S |  |  |  |  |  |  |  |
| ALLNKYMA | ALLNKY00CM1 | K716A | 1 | 12 | 00002 |  |  | S | S |  |  |  |  |  |  |  |
| ALLNKYMA | ALLNKY00CM1 | K716A | 1 | 12 | 00003 |  |  | S | S |  |  |  |  |  |  |  |
| ALLNKYMA | ALLNKY00CM1 | K716A | 1 | 12 | 00004 |  |  | S | S |  |  |  |  |  |  |  |
| ALLNKYMA | ALLNKY00CM1 | K716A | 1 | 12 | 00005 |  |  | S | S |  |  |  |  |  |  |  |
| ALLNKYMA | ALLNKY00CM1 | K716A | 1 | 12 | 00006 |  |  | S | S |  |  |  |  |  |  |  |
| ALLNKYMA | ALLNKY00CM1 | K716A | 1 | 12 | 00007 |  |  | S | S |  |  |  |  |  |  |  |
| ALLNKYMA | ALLNKY00CM1 | K716A | 1 | 12 | 00008 |  |  | S | S |  |  |  |  |  |  |  |
| ALLNKYMA | ALLNKY00CM1 | K716A | 1 | 12 | 00009 |  |  | S | S |  |  |  |  |  |  |  |
| ALLNKYMA | ALLNKY00CM1 | K716A | 1 | 12 | 00010 |  |  | S | S |  |  |  |  |  |  |  |
| ALLNKYMA | ALLNKY00CM1 | K716A | 1 | 12 | 00011 |  |  | S | S |  |  |  |  |  |  |  |
| ALLNKYMA | ALLNKY00CM1 | K716A | 1 | 12 | 00012 |  |  | S | S |  |  |  |  |  |  |  |
| ALLNKYMA | ALLNKY01CM1 | K716A | 1 | 12 | 00001 |  |  | S | S |  |  |  |  |  |  |  |
| ALLNKYMA | ALLNKY01CM1 | K716A | 1 | 12 | 00002 |  |  | W | W | 101 | OC03 | ALLNKYMA | ALLNKY01CM1 | 072998 | NK0268 | 1998 |
| ALLNKYMA | ALLNKY01CM1 | K716A | 1 | 12 | 00003 |  |  | W | W | 101 | OC03 | ALLNKYMA | ALLNKY01CM1 | 072998 | NK0268 | 1998 |
| ALLNKYMA | ALLNKY01CM1 | K716A | 1 | 12 | 00004 |  |  | W | W | 102 | OC03 | ALLNKYMA | ALLNKY01CM1 | 072998 | NK0268 | 1998 |
| ALLNKYMA | ALLNKY01CM1 | K716A | 1 | 12 | 00005 |  |  | W | W | 102 | OC03 | ALLNKYMA | ALLNKY01CM1 | 072998 | NK0268 | 1998 |
| ALLNKYMA | ALLNKY01CM1 | K716A | 1 | 12 | 00006 |  |  | S | S |  |  |  |  |  |  |  |
| ALLNKYMA | ALLNKY01CM1 | K716A | 1 | 12 | 00007 |  |  | W | W | 103 | OC03 | ALLNKYMA | ALLNKY01CM1 | 052902 | NK0319 | 2002 |
| ALLNKYMA | ALLNKY01CM1 | K716A | 1 | 12 | 00008 |  |  | W | W | 103 | OC03 | ALLNKYMA | ALLNKY01CM1 | 052902 | NK0319 | 2002 |
| ALLNKYMA | ALLNKY01CM1 | K716A | 1 | 12 | 00009 |  |  | W | W | 104 | OC03 | ALLNKYMA | ALLNKY01CM1 | 052902 | NK0319 | 2002 |
| ALLNKYMA | ALLNKY01CM1 | K716A | 1 | 12 | 00010 |  |  | W | W | 104 | OC03 | ALLNKYMA | ALLNKY01CM1 | 052902 | NK0319 | 2002 |
| ALLNKYMA | ALLNKY01CM1 | K716A | 1 | 12 | 00011 |  |  | W | W | 101 | OC12 | ALLNKYMA | ALLNKY01CM1 | 081202 | NK0321 | 2002 |
| ALLNKYMA | ALLNKY01CM1 | K716A | 1 | 12 | 00012 |  |  | W | W | 101 | OC12 | ALLNKYMA | ALLNKY01CM1 | 081202 | NK0321 | 2002 |
| ALLNKYMA | MARTKYMA | K556A | 1 | 12 | 00001 |  |  | W | W | 102 | OC12 | ALLNKYMA | ALLNKY01CM1 | 081202 | NK0321 | 2002 |
| ALLNKYMA | MARTKYMA | K556A | 1 | 12 | 00002 |  |  | W | W | 102 | OC12 | ALLNKYMA | ALLNKY01CM1 | 081202 | NK0321 | 2002 |
| ALLNKYMA | MARTKYMA | K556A | 1 | 12 | 00003 | 1 |  | W | S | 102 | OC12 | ALLNKYMA | MARTKYMA | 032201 | NK0302 | 2001 |
| ALLNKYMA | MARTKYMA | K556A | 1 | 12 | 00004 | 2 |  | W | W | 102 | OC12 | ALLNKYMA | MARTKYMA | 032201 | NK0302 | 2001 |
| ALLNKYMA | MARTKYMA | K556A | 1 | 12 | 00005 | 2 |  | S | W |  |  |  |  |  |  |  |
| ALLNKYMA | MARTKYMA | K556A | 1 | 12 | 00006 |  |  | S | S |  |  |  |  |  |  |  |
| ALLNKYMA | MARTKYMA | K556A | 1 | 12 | 00007 |  |  | W | W | 103 | OC12 | ALLNKYMA | MARTKYMA | 120595 | NK0240 | 1998 |
| ALLNKYMA | MARTKYMA | K556A | 1 | 12 | 00008 |  |  | W | W | 103 | OC12 | ALLNKYMA | MARTKYMA | 120595 | NK0240 | 1998 |
| ALLNKYMA | MARTKYMA | K556A | 1 | 12 | 00009 |  |  | S | S |  |  |  |  |  |  |  |
| ALLNKYMA | MARTKYMA | K556A | 1 | 12 | 00010 |  |  | S | S |  |  |  |  |  |  |  |
| ALLNKYMA | MARTKYMA | K556A | 1 | 12 | 00011 |  |  | S | S |  |  |  |  |  |  |  |
| ALLNKYMA | MARTKYMA | K556A | 1 | 12 | 00012 |  |  | S | S |  |  |  |  |  |  |  |
| ALLNKYMA | PKVLKYMA | K557A | 1 | 12 | 00001 |  |  | S | S |  |  |  |  |  |  |  |
| ALLNKYMA | PKVLKYMA | K557A | 1 | 12 | 00002 |  |  | W | W | 201 | OM02 | ALLNKYMA | PKVLKYMA | 072501 | NK0274 | 2001 |
| ALLNKYMA | PKVLKYMA | K557A | 1 | 12 | 00003 |  |  | W | W | 202 | OM02 | ALLNKYMA | PKVLKYMA | 072501 | NK0308 | 2001 |
| ALLNKYMA | PKVLKYMA | K557A | 1 | 12 | 00004 |  |  | W | W | 204 | OM02 | ALLNKYMA | PKVLKYMA | 112202 | NK0324 | 2002 |
| ALLNKYMA | PKVLKYMA | K557A | 1 | 12 | 00005 |  |  | W | W | 203 | OM02 | ALLNKYMA | PKVLKYMA | 112202 |  | 2002 |
| ALLNKYMA | PKVLKYMA | K557A | 1 | 12 | 00006 |  |  | S | S |  |  |  |  |  |  |  |
| ALLNKYMA | PKVLKYMA | K557A | 1 | 12 | 00007 |  |  | S | S |  |  |  |  |  |  |  |
| ALLNKYMA | PKVLKYMA | K557A | 1 | 12 | 00008 |  |  | S | S |  |  |  |  |  |  |  |
| ALLNKYMA | PKVLKYMA | K557A | 1 | 12 | 00009 |  |  | W | W | 103 | OC48 | ALLNKYMA | PKVLKYMA | 042197 | NK0251 | 1998 |
| ALLNKYMA | PKVLKYMA | K557A | 1 | 12 | 00010 |  |  | W | W | 103 | OC48 | ALLNKYMA | PKVLKYMA | 042197 | NK0251 | 1998 |
| ALLNKYMA | PKVLKYMA | K557A | 1 | 12 | 00011 |  |  | W | W | 102 | OC48 | ALLNKYMA | PKVLKYMA | 042197 | NK0251 | 1998 |
| ALLNKYMA | PKVLKYMA | K557A | 1 | 12 | 00012 |  |  | W | W | 102 | OC48 | PNVLKYMA | PNVLKYMA | 080201 | NK0274 | 1998 |
| ALLNKYMA | PRBGKYES | K563A | 1 | 12 | 00002 |  |  | S | S | 101 | OC48 | PKVLKYMA | PKVLKYMA | 080201 | NK0274 | 2001 |
| ALLNKYMA | PRBGKYES | K563A | 1 | 12 | 00003 |  |  | W | W | 102 | PKVLKYMA | PNVLKYMA | 080201 | NK0308 | 2001 |

01-Aug-03

| FIBER_ALOC | FIBER_ZLOC | CABLE # | LOW COUNT | HIGH COUNT | WORKING | SPARE NOW | SPARE PEND |
|---|---|---|---|---|---|---|---|
| ACMENCMA | | | | | | | |
| | ATSNNCMA | F3032 | 1 | 18 | 8 | 10 | 10 |
| | BOTNNCMAHO | F3067 | 1 | 36 | 14 | 20 | 20 |
| | WLMGNCLE | F3017 | 1 | 12 | 2 | 6 | 6 |
| | WLMGNCLE | F3073 | 1 | 36 | 20 | 16 | 16 |
| APEXNCACNP1 | | | | | | | |
| | APEXNCCE | OF2 | 41 | 42 | 0 | 2 | 2 |
| APEXNCCE | | | | | | | |
| | APEXNCCF | F3209 | 1 | 30 | 0 | 24 | 24 |
| | CARYNCBCHO1 | F3280 | 1 | 2 | 8 | 0 | 0 |
| | CARYNCCE | F3001 | 1 | 4 | 6 | 4 | 4 |
| | CARYNCCE | F3246 | 3 | 18 | 2 | 10 | 10 |
| | CARYNCCE | F3312 | 1 | 24 | 0 | 12 | 12 |
| | CARYNCCE | F3313 | 1 | 48 | 8 | 38 | 38 |
| | CARYNCGDHO | F3286 | 1 | 2 | 10 | 0 | 0 |
| | CARYNCGDHO | F3288 | 1 | 2 | 10 | 2 | 2 |
| | CPHLNCRO | F3215 | 1 | 24 | 2 | 8 | 8 |
| | FQVRNCXA | F3211 | 1 | 6 | 0 | 2 | 2 |
| | RLGHNCGA | F3214 | 1 | 26 | 16 | 13 | 13 |
| | RLGHNCGA | F3323 | 1 | 78 | 2 | 58 | 58 |
| | RLGHNCGA | F3324 | 1 | 18 | 12 | 12 | 12 |
| APEXNCCF | | | | | | | |
| | SXPHNCMA | F5929 | 1 | 24 | 20 | 20 | 20 |
| | WHHLNCRS | F3218 | 1 | 24 | 6 | 22 | 22 |
| ATSNNCMA | | | | | | | |
| | BRGWNCMA | F3020 | 1 | 24 | 4 | 12 | 12 |
| | LMTNNCMA | F3077 | 1 | 36 | 2 | 30 | 30 |
| BOLVNCXA | | | | | | | |
| | WLMGNCLE | F3026 | 1 | 6 | 10 | 2 | 2 |
| BOTNNCMA | | | | | | | |
| | CKTNNCUO | F3011 | 1 | 6 | 4 | 2 | 2 |
| BOTNNCMAHO1 | | | | | | | |
| | SPLYNCAA | F3071 | 1 | 18 | 6 | 12 | 12 |
| | SPLYNCXA | F3070 | 1 | 6 | 4 | 2 | 2 |
| BRGWNCAACM1 | | | | | | | |
| | BRGWNCMA | F3065 | 1 | 4 | 4 | 0 | 0 |

FIG. 12

| SONET SYSTEMS for WILMINGTON | | | DATA EXTRACTED: 7/16/2003 | | | |
|---|---|---|---|---|---|---|
| | | | PRINTED: 8/1/2003 | | | |
| SCID | ALOC | ZLOC | CABL | FIBER | WDM CH | YEAR |
| 4D/T3XP/WL | | | | | | |
| | WGVLNCMA | WLMGNCVDCM1 | F3063 | 1 | | 2001 |
| | WGVLNCMA | WLMGNCVDCM1 | F3063 | 2 | | 2001 |
| | WGVLNCMA | WLMGNCWI | F3027 | 1 | | 2001 |
| | WGVLNCMA | WLMGNCWI | F3027 | 2 | | 2001 |
| NBGSN1 | | | | | | |
| | GBSNNCMA | LRBGNCMA | F3058 | 11 | | 1998 |
| | GBSNNCMA | LRBGNCMA | F3058 | 12 | | 1998 |
| | GBSNNCMA | RCHMNCMA | F3059 | 11 | | 1998 |
| | GBSNNCMA | RCHMNCMA | F3059 | 12 | | 1998 |
| | LRBGNCMA | RWLDCMA | F3033 | 9 | | 1998 |
| | LRBGNCMA | RWLDCMA | F3033 | 10 | | 1998 |
| | PLTNNCRS | RCHMNCMA | F3038 | 9 | | 1998 |
| | PLTNNCRS | RCHMNCMA | F3038 | 10 | | 1998 |
| NBNCR1 | | | | | | |
| | FXFRNCRS | LRBGNCMA | F3047 | 7 | | 2000 |
| | FXFRNCRS | LRBGNCMA | F3047 | 8 | | 2000 |
| | FXFRNCRS | WHHLNCRS | F3048 | 7 | | 2000 |
| | FXFRNCRS | WHHLNCRS | F3048 | 8 | | 2000 |
| | GBSNNCMA | LRBGNCMA | F3058 | 5 | | 2003 |
| | GBSNNCMA | LRBGNCMA | F3058 | 6 | | 2003 |
| | GBSNNCMA | RCHMNCMA | F3059 | 5 | | 2003 |
| | GBSNNCMA | RCHMNCMA | F3059 | 6 | | 2003 |
| | PLTNNCRS | RCHMNCMA | F3038 | 3 | | 2003 |
| | PLTNNCRS | RCHMNCMA | F3038 | 4 | | 2003 |
| NBNCR3 | | | | | | |
| | ACMENCMA | ATSNNCMA | F3032 | 5 | | 1998 |
| | ACMENCMA | ATSNNCMA | F3032 | 6 | | 1998 |
| | ACMENCMA | WLMGNCLE | F3073 | 13 | | 1998 |
| | ACMENCMA | WLMGNCLE | F3073 | 14 | | 1998 |
| | ATSNNCMA | LMTNNCMA | F3077 | 7 | | 1998 |
| | ATSNNCMA | LMTNNCMA | F3077 | 8 | | 1998 |
| | BRGWNCMA | CSHYNCMA | F3078 | 5 | | 1998 |
| | BRGWNCMA | CSHYNCMA | F3078 | 6 | | 1998 |
| | BRGWNCMA | KNVLNCES | F3020 | 3 | | 1998 |
| | BRGWNCMA | KNVLNCES | F3020 | 4 | | 1998 |
| | CSHYNCMA | WLMGNCMA | F3075 | 5 | | 1998 |
| | CSHYNCMA | WLMGNCWI | F3075 | 6 | | 1998 |
| | FAMTNCMA | LMTNNCMA | F3015 | 11 | | 1998 |
| | FAMTNCMA | LMTNNCMA | F3015 | 12 | | 1998 |
| | FAMTNCMA | RWLDNCMA | F3025 | 11 | | 1998 |
| | FAMTNCMA | RWLDNCMA | F3025 | 12 | | 1998 |
| | GBSNNCMA | LRBGNCMA | F3058 | 9 | | 1998 |
| | GBSNNCMA | LRBGNCMA | F3058 | 10 | | 1998 |
| | GBSNNCMA | RCHMNCMA | F3059 | 9 | | 1998 |
| | GBSNNCMA | RCHMNCMA | F3059 | 10 | | 1998 |
| | LRBGNCMA | RWLDNCMA | F3033 | 11 | | 1998 |

*FIG. 13*

METHODS, SYSTEMS, AND STORAGE MEDIUMS FOR PROVIDING DATABASE MANAGEMENT SERVICES FOR A TELECOMMUNICATIONS SYSTEM

BACKGROUND OF THE INVENTION

Embodiments of the invention relate generally to telecommunications systems, and more particularly, to methods, systems, and storage mediums for providing database management services for a telecommunications system.

Managing fiber and cable networks is generally performed in a haphazard fashion using legacy system data and reports that are incompatible with newer software and technology. With large volumes of data spread across disparate systems, it is difficult if not impossible to provide efficient analysis of fiber and cable networking systems, equipment, and related operations. Much of the reporting and analyses are performed manually. As new technology continues to bring forth a wealth of advancements in communications networks and equipment, telecommunications service providers will require updated models for handling data relating to existing and future transport facilities and services in order to keep pace with these changes. Clearly, using existing manual processes for analyzing networking data and providing network services is not an optimum solution.

What is needed, therefore, is a way to integrate data from legacy systems for providing efficient handling of networking data that enables analysis and reporting.

SUMMARY OF THE INVENTION

Embodiments relate to methods, systems, and storage mediums for providing database management services for a telecommunications system. The method includes extracting a first set of raw data from a legacy system via a first routine of a network planning application. The method also includes executing a keystroke emulator on the first set of raw data operable for further extracting details relating to the telecommunications transmission lines data. The method further includes extracting a second set of raw data from the legacy system via a second routine of a network planning application. The method also includes extracting a third set of raw data from the legacy system via a third routine of the network planning application. The first set of raw data relates to telecommunications transmission lines, the second set of raw data relates to telecommunications equipment, and the third set of raw data relates to telecommunications wavelength division multiplexing data. Utilizing a managed language application, the method includes transferring raw data resulting from the execution of a keystroke emulator, the second set of raw data, and the third set of raw data to a first spreadsheet application macro, whereby the first spreadsheet application macro is operable for merging selected data. The method also includes generating a first spreadsheet file comprising data selected and combined by the first spreadsheet application macro.

The system includes a server executing a legacy system program; a network planning application including a first routine, a second routine, and a third routine; and a managed language application executing on the server. The managed language program includes a first spreadsheet application macro, a second spreadsheet application macro, and a third spreadsheet application macro. The system also includes a legacy data repository in communication with the server via a communications network, whereby the legacy data repository stores legacy tables and reports. The system further includes a relational database in communication with the server via the communications network. The server extracts a first set of raw data from a legacy system via a first routine of a network planning application. A keystroke emulator is run on the first set of raw data operable for further extracting details relating to the telecommunications transmission lines data. The server further extracts a second set of raw data from the legacy system via a second routine of a network planning application. The server further extracts a third set of raw data from the legacy system via a third routine of the network planning application. The first set of raw data relates to telecommunications transmission lines, the second set of raw data relates to telecommunications equipment, and the third set of raw data relates to telecommunications wavelength division multiplexing data. Utilizing a managed language application, the server transfers raw data resulting from the execution of a keystroke emulator, the second set of raw data, and the third set of raw data to a first spreadsheet application macro, whereby the first spreadsheet application macro is operable for merging selected data. The server also generates a first spreadsheet file comprising data selected and combined by the first spreadsheet application macro.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES:

FIG. 4 is a sample WDMTABLE intermediate file derived from the execution of the M_GETCAB macro of the database management system and is used to create DETCAB files as well as WDM Summaries in exemplary embodiments of the invention;

FIG. 5 is a sample SCIDTBL intermediate file derived from the execution of the M_GETCAB macro of the database management system and is used to create DETCAB files in exemplary embodiments of the invention;

FIG. 6 is a sample WDMSUMMARY output file derived from the execution of the M_FORMATWDM macro of the database management system in exemplary embodiments of the invention;

FIG. 8 is a sample state DETCAB worksheet derived from the execution of the M_GETCAB macro of the managed language application in exemplary embodiments of the invention;

FIG. 9 is a sample state CABLE CROSS SECTION TOTAL worksheet derived from the execution of the M_GETCAB macro of the managed language application in exemplary embodiments of the invention;

FIG. 13 is a sample SONET SYSTEMS report produced by the database management system in exemplary embodiments of the invention.

DETAILED DESCRIPTION OF THE INVENTION

The database management system of the invention provides a means to evaluate fiber, wavelength division multiplexing (WDM), and dense wavelength division multiplexing (DWDM) networks for determining cost efficient ways for building and maintaining a network. The database management system is flexible enough to be used by cable network enterprises in addition to fiber network enterprises. The data acquired by implementing the database management system of the invention may be used by a variety of entities that are involved with telecommunication enterprises, such as engineers, marketing, portfolio management, product management, and finance groups. Database elements are structured for quick analysis and macros utilized by the database management system merge, query, and provide reporting capabilities using the data.

Figure 1:
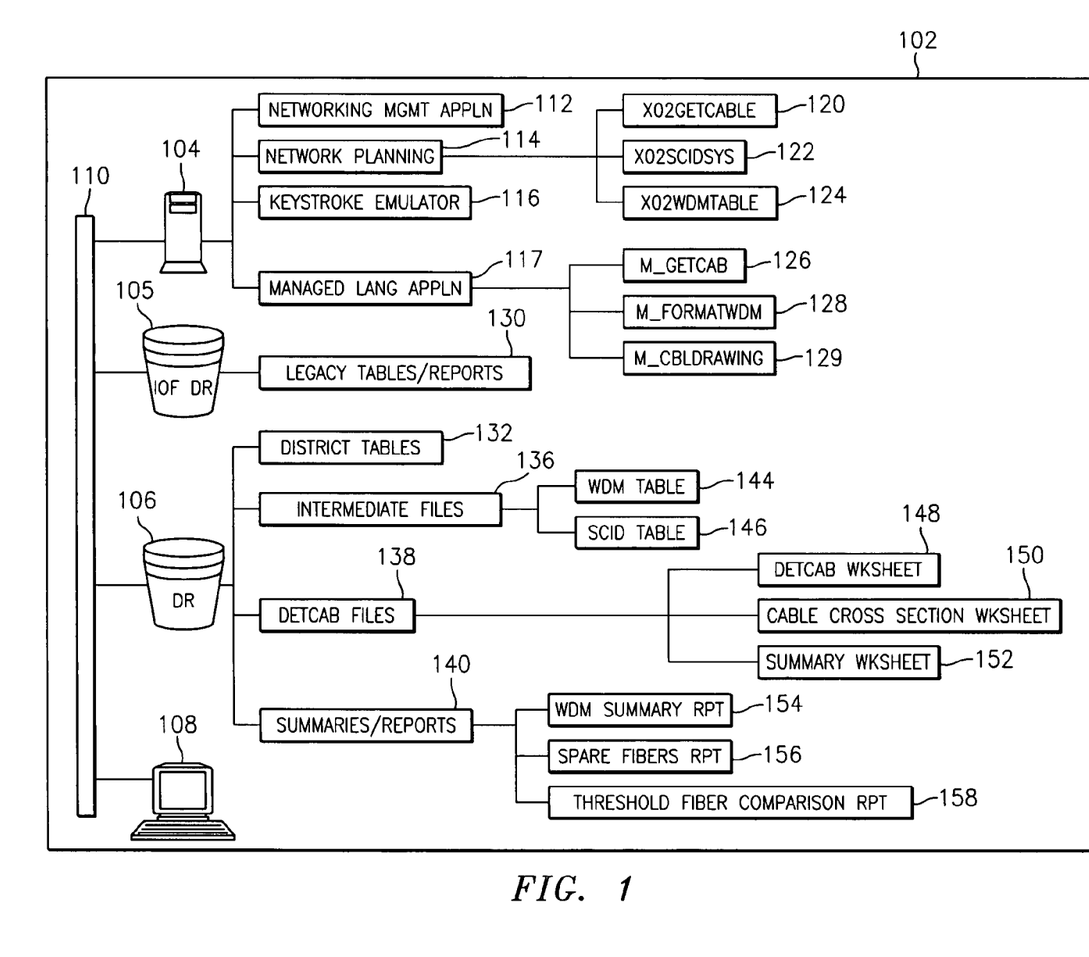
FIG. 1 is a block diagram of a system upon which the database management system is implemented in exemplary embodiments of the invention.

The database management system is executed via a system such as that depicted in FIG. 1. FIG. 1 includes a host system 102 comprising a server 104, an inter-office facilities (IOF) data repository 105, a data repository 106, and a computer client 108 in communication with one another via a network 110. Server 104 may comprise a high-powered multiprocessor computer device including web server and applications server software for receiving requests from computer client 108 to run programs, access databases, and generate reports as described further herein.

Server 104 executes a networking application 112. Networking application 112 comprises a telecommunications software product for facilitating network provisioning for equipment such as carrier circuits and message trunks. Networking application 112 may also provide inventory management of networking facilities and equipment and supports a variety of transmissions technologies serviced by the enterprise of host system 102. Networking application 112 may comprise a proprietary application or may be a commercial application such as TIRKS® by Telcordia® Technologies, Inc. of Piscataway, N.J. Server 104 further executes networking planning software 114 that assists host system 102 employees in planning, monitoring, and reporting on network facilities and equipment. Network planning software 114 may be a proprietary application or may comprise a commercial product such as Telcordia® FEPS Planning Workstation (PWS) programs. Network planning software 114 includes a routine (e.g., X02GETCABLE routine 120) for extracting data relating to telecommunications transmission lines from legacy files 130, a routine (e.g., X02SCIDSYS routine 122) for extracting data relating to telecommunications equipment from legacy files 130, and a routine (e.g., X02WDMTABLE routine 124) for extracting wavelength division multiplexor equipment (WDM) data from a legacy WDM table. The data is extracted from legacy reports produced by network planning software 114 as described further herein.

Server 104 also executes a keystroke emulator application 116 that allows a user to further drill down the raw data produced a result of executing X02GETCABLE routine 120. Keystroke emulator application 116 may be a proprietary tool or may comprise a commercial application such as Task-Mate™. In addition, a managed language program 117, such as Microsoft Visual Basic® or C++ is executing on server 104. Managed language program 117 includes a spreadsheet component, such as Microsoft® Excel®, to produce and execute macros M_GETCAB 126, M_FORMATWDM 128, and M_CBLDRAWING 129 as described further herein.

IOF data repository 105 is a legacy data store that houses data created and utilized by legacy applications such as networking management application 112 and network planning application 114. Applications 112 and 114 produce legacy tables and reports 130.

Figure 3:
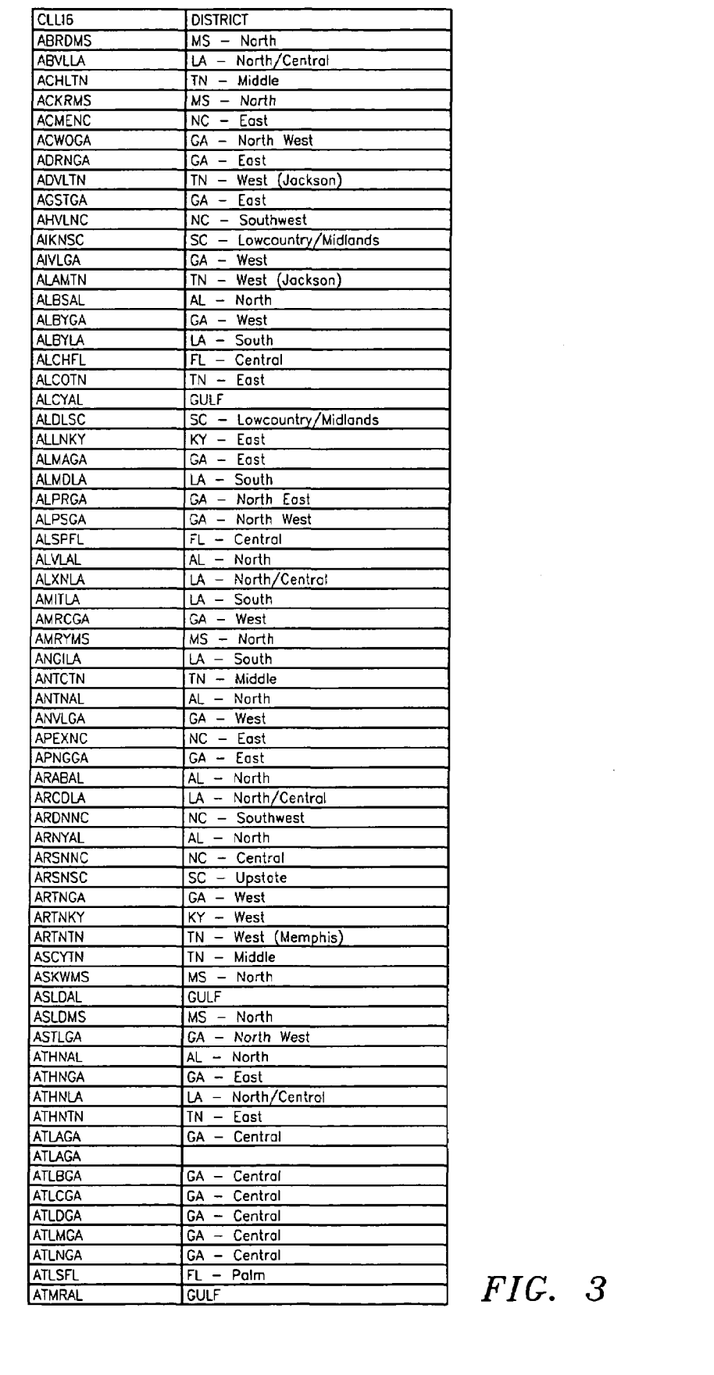
FIG. 3 is a sample district table that is used as an input file to the M_GETCAB macro of the database management system in exemplary embodiments of the invention.

Data repository 106 stores information produced by database management system 102 such as intermediate files 136, DETCAB files 138, and summaries/reports 140. These and other documents are described further herein. Data repository 106 further stores district tables 132. A portion of a sample DISTRICT table is shown generally in FIG. 3. The table of FIG. 3 provides information for a telecommunications district such as geographic coding information, fiber location data, and detailed district locations. Data repository 106 is preferably utilizing a relational database configuration such as Microsoft Access® for allowing data stored therein to be organized and manipulated on various levels.

Data repositories 105 and 106 may each comprise a standalone storage device or may, along with server 104, comprise a single unit such as a mainframe computer.

Information produced by networking management application 112 and network planning software 114 is processed by routines 120-124 and keystroke emulator 116 to produce raw data that is integrated by database management system 102 utilizing managed language application 117 and macros 126, 128, and 129.

Computer client 108 is used by host system employees to execute the database management system processes described herein. Computer client 108 requests execution of applications via server 104 and generates reports. Computer client 108 may be a general-purpose computer such as a desktop, laptop, or similar device.

Network 110 may comprise a local area network (LAN) or other suitable network system for facilitating communication between server 104, data repositories 105 and 106, and computer client 108.

Figure 2:
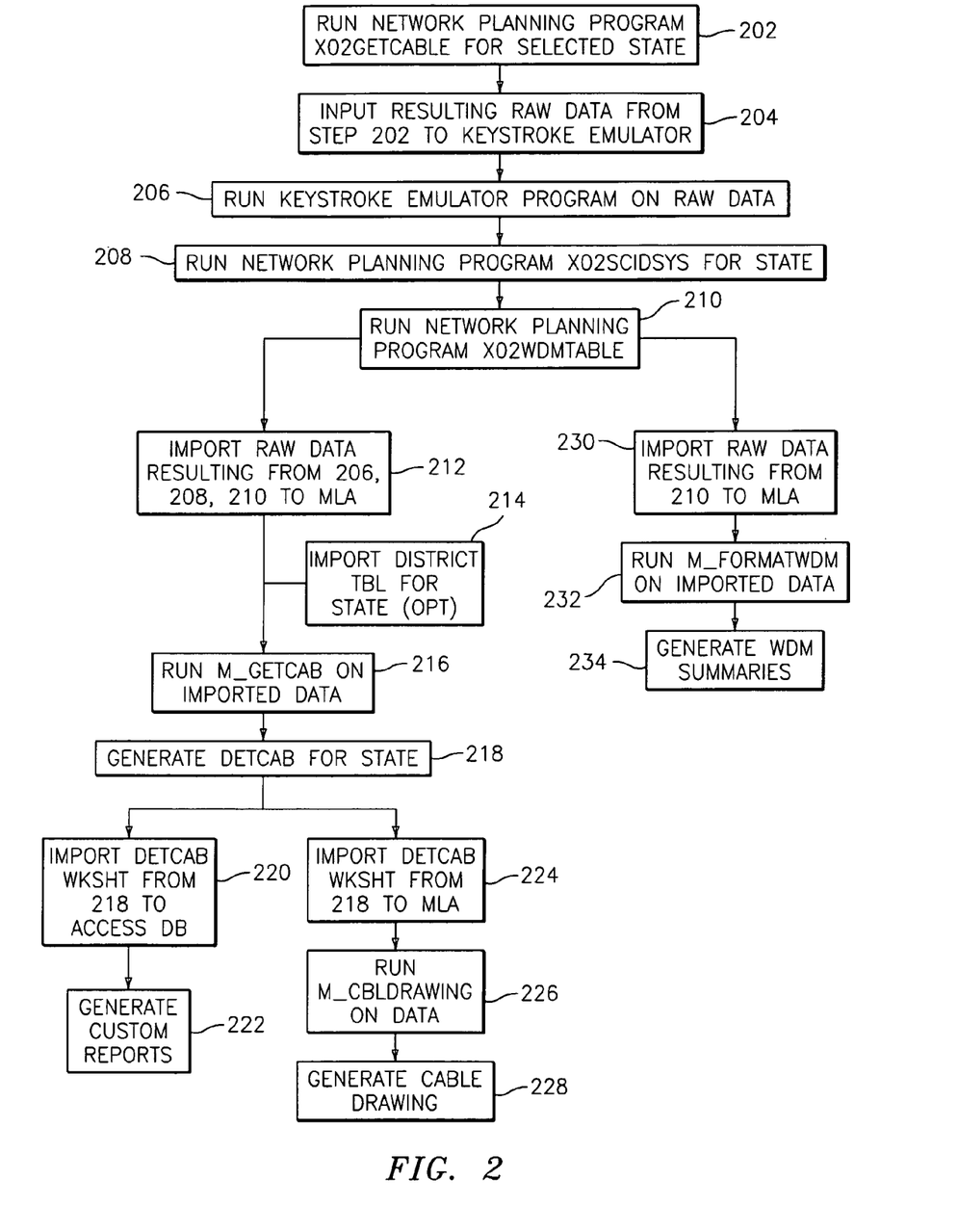
FIG. 2 is a flowchart describing the process of implementing the database management system in exemplary embodiments of the invention.

Data produced from various disparate network systems and software are merged together by database management system 102 and structured in a way that allows for analyses and reporting activities to be performed as will now be described in FIG. 2. A user on computer client 108 executes network planning application 114 routine X02GETCABLE 120 for a selected state at 202. This step extracts raw data from legacy tables 130 in IOF data repository 105 (e.g., HICAP/SPAN tables). HICAP refers to high-capacity cable lines such as leased lines for long distance carrier enterprises. The type of raw data extracted from legacy tables 130 includes cable data relating to fiber cables/transmission lines serviced by the enterprise executing the database management system 102. The raw data output of this execution is then fed to keystroke emulator 116 at 204. Keystroke emulator 116 comprises an extraction routine that performs extractions on the raw data, enabling the user to further drill down the raw data at 206.

The user then executes network planning program 114 X02SCIDSYS routine 122 at 208. This step extracts raw data from legacy tables/reports 130 in IOF data repository 105. The type of raw data extracted from X02SCIDSYS routine 122 includes information relating to the telecommunications equipment serviced by the enterprise system such as SONET equipment used to handle trunking.

The user then executes network planning program 114 X02WDMTABLE routine 124 at 210. This step extracts raw data from legacy tables/reports 130 in IOF data repository 105 that pertains to WDM equipment. Routine 124 may be run for one state or for an entire region. The type of raw data produced by this step includes WDM information such as WDM identifier, WDM type, CLLI codes, and WDM A and Z locations. Examples of WDM types include "OMO2" referring to a 2-channel WDM, and "OM12" and "OM13" referring to 12 and 13 channel WDM systems to name a few.

The raw data extracted at steps 206, 208, and 210 are imported to managed language application macro, M_GETCAB at 212. The raw data extracted is linked by the M_GETCAB macro by relating each channel of WDM raw data with corresponding SCID data. When an OM* carrier (e.g., WDM system) is detected in the fiber data (i.e., raw data resulting from step 206), a lookup is used from the WDM data to insert a row into a DETCAB worksheet for each working WDM channel. DETCAB worksheets are described further herein. This linking of WDM raw data to SCID data provides a database that enables an analyst to view paths of SCIDs in a single step.

Optionally, district tables 132 from IOF data repository 106 for the selected state may be accessed by the M_GETCAB macro for further filtering the raw data by district at step 214. A portion of a sample district table is shown generally in FIG. 3. District tables are provided to map districts to CLLIs.

At 216, a user runs the M_GETCAB macro 126. The M_GETCAB macro 126 is a program that processes the data extracted as a result of the execution of routines 120-124 described above. The M_GETCAB macro 126 is written using managed language application 117. The M_GETCAB macro 126 merges the raw data produced in steps 206, 208, and 210 and produces intermediate files 136 in spreadsheet form. Two intermediate spreadsheet files are shown in FIGS. 4 and 5.

Figure 10:
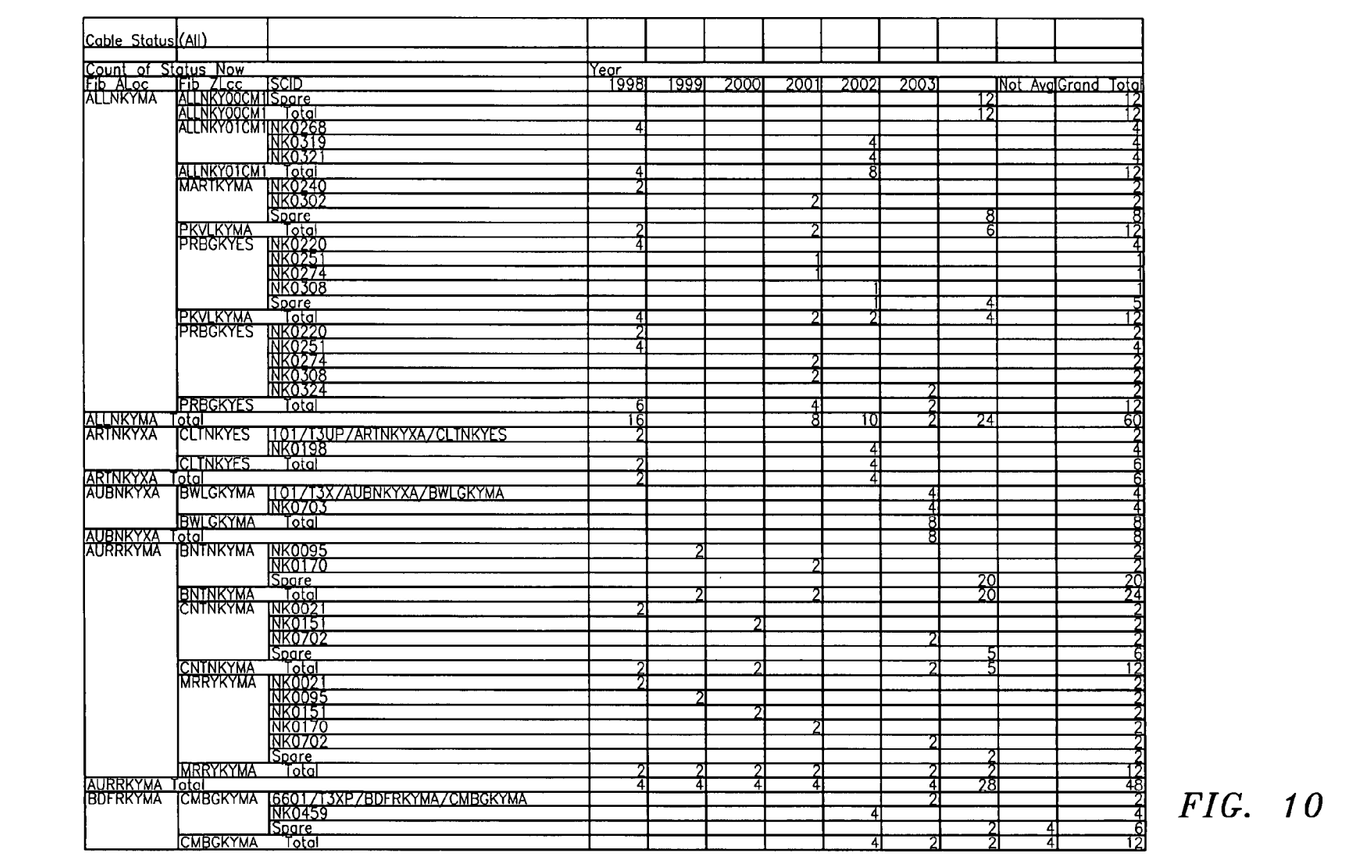
FIG. 10 is a sample state SUMMARY worksheet derived from the execution of the M_GETCAB macro of the managed language application in exemplary embodiments of the invention.

Using intermediate files produced from the M_GETCAB macro 126, a DETCAB workbook comprising a DETCAB worksheet 148, a CABLE CROSS SECTION worksheet 150, and SUMMARY worksheet 152, is created and stored in data repository 106 at 218. Sample worksheets 148-152 are shown in FIGS. 8-10. The DETCAB worksheet of FIG. 8 provides a variety of details for each working WDM channel, such as Fiber A and Z locations for a cable 902 and 904, cable number 906, fiber identification 908, WDM channel number 910, a restriction code 912, a status now 914, status pending 916, the date the fiber was placed in service 918, the SCID 920, among other information. The restriction code 912 field provides information concerning any equipment restrictions. For example, a 'J' in restrictive code 912 field indicates that a restriction relates to a jumper. Other codes available for restrictive code 912 field include 'DEF' for defective, '$' for spare, 'W' for work, to name a few.

SUMMARY worksheets 152 provide a variety of details such as whether a cable cross section is being used for IOF, SmartRings®, Lightgates®, Asynchronous Equipment, or Specials. A sample Summary worksheet is illustrated in FIG. 10.

CABLE CROSS SECTION worksheets 150 produced from the M_GETCAB macro 126 allow a user to view fiber growth trends, those with a threshold flag of 'Y', spare/available fibers, not available fibers, and cable status in order to quickly analyze potential cross sections for exhaust. A sample cable cross section worksheet is shown in FIG. 9. A user may further use an autofilter to quickly analyze database problems and update the database for more accurate future analysis. For example, a filter on 'cable status=PA' and 'Wkg Util>0' generally means that the cable status should be changed to an 'IE' since there are fibers working on it. Also, 'not available' percents greater than 25 can be analyzed quickly on the DETCAB worksheet to determine if there are defective units that need to be fixed or if there are restrictions that may be inaccurate and may need to be removed to correctly show either working on spare fibers.

DETCAB worksheet 148 is used as a database of combined information by M_GETCAB macro 126 to create SUMMARY and CABLE CROSS SECTION worksheets described above. These worksheets are used to help in fiber planning to determine how fast cross sections are filing up. The CABLE CROSS SECTION worksheet 150 has thresholds built into it to easily filter the fiber paths that may require rebuilding. SUMMARY worksheets 152 illustrate what types of SCIDs are working on the fiber cross sections.

Figure 7:
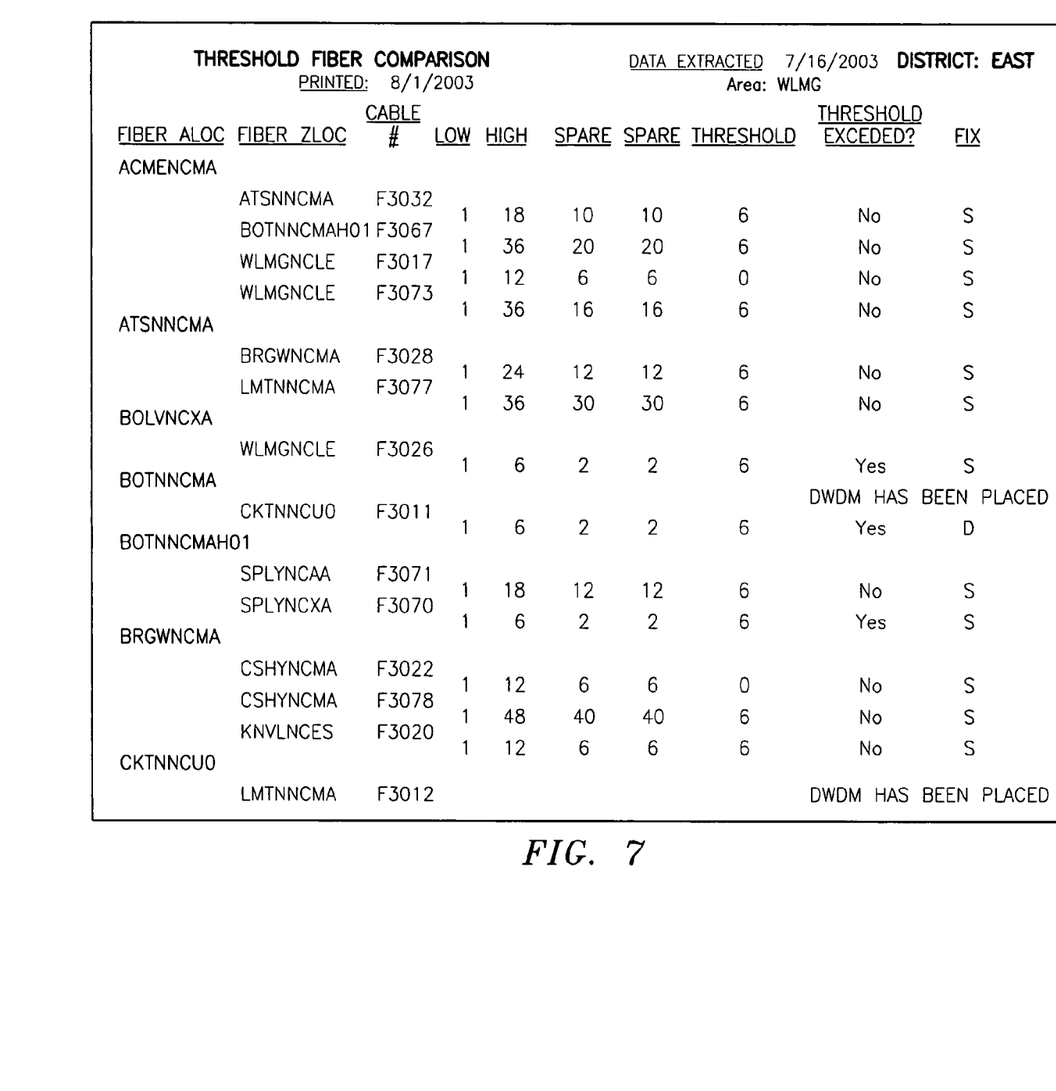
FIG. 7 is a sample THRESHOLD FIBER COMPARISON report produced by the database management system in exemplary embodiments of the invention.

Execution of the custom and pre-built queries in the Access™ database also produces summaries and reports, a sample of which is shown in FIG. 7. FIG. 7 illustrates a THRESHOLD FIBER COMPARISON report produced by the database management system 102. A THRESHOLD FIBER COMPARISON REPORT provides information such as the threshold limits for a given fiber, whether the threshold limits have been exceeded, and a fix status for the fiber. This information is provided along with the low/high quantities for a fiber (e.g., the lowest and highest numbers in the fiber complement), as well as the number of spare fibers. These and other reports may be stored in summaries/reports database 140 in data repository 106.

The DETCAB worksheet 148 is imported to an Access™ database (or similar relational database) of data repository 106 at 220 where custom and pre-built queries may be used to analyze the data. This information can be further searched and drilled down for specific information at 222. For example, a user may place a filter on the SCID in order to view all the cross sections inventoried in networking application 112 for a given ring. A user may also, for example, place a custom filter on the type "T?X" and a filter on the status now="W" to view all of the Async systems still in service.

Figure 12:
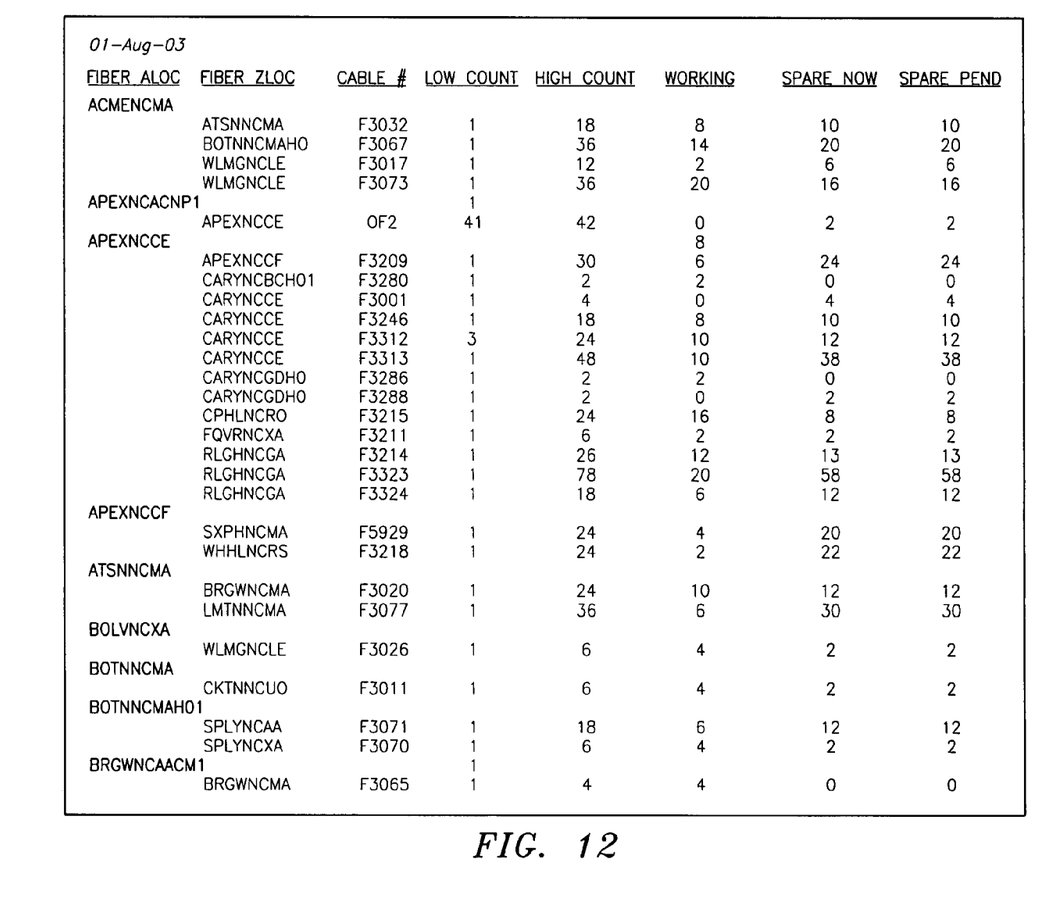
FIG. 12 is a sample SPARE FIBERS report produced by the database management system in exemplary embodiments of the invention.

Other reports generated via step 222 include SPARE FIBERS reports and SONET SYSTEMS reports as shown generally in FIGS. 12 and 13, respectively. SPARE FIBERS reports may be generated for a given date and provide status information on the number of 'working', 'spare now', and 'spare pending' fibers for a location.

Figure 11:
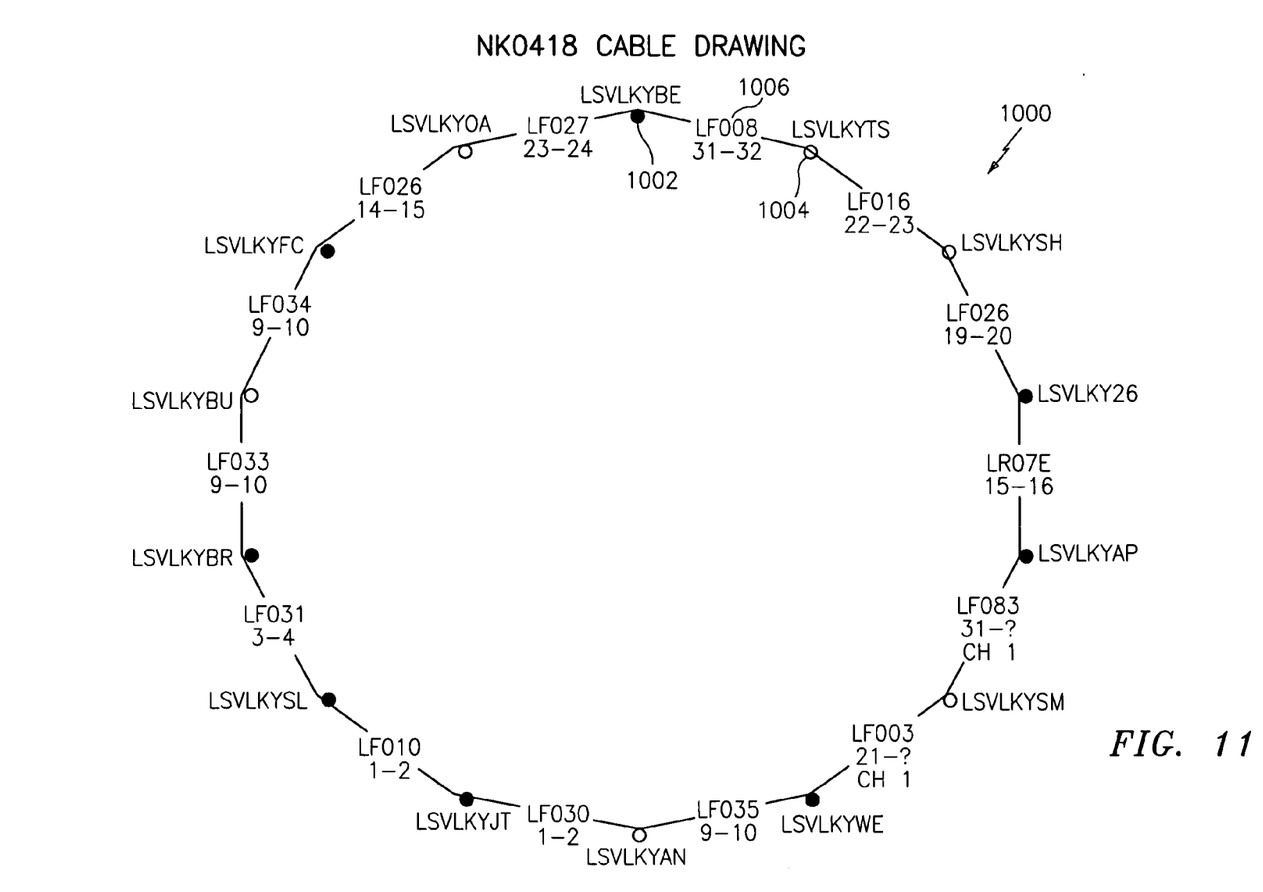
FIG. 11 is a sample cable drawing derived from the execution of the M_CBLDRAWING macro of the database management system using information obtained from a DETCAB worksheet in exemplary embodiments of the invention.

The data used in the DETCAB worksheet of FIG. 8 may be further used to produce a cable drawing that plots a ring of fiber routes including electronic equipment. This is accomplished by importing the DETCAB worksheet 148 to managed language application 117 at step 224. The macro, M_CBLDRAWING 129 is run on the worksheet data at step 226 and a cable ring drawing is generated at step 228. A sample cable ring drawing 1000 is shown in FIG. 11. Drawing 1000 includes a ring of nodes 1002 and passthroughs 1004 interconnected by lines 1006. Nodes 1002 refer to networking equipment serviced by the enterprise. Passthroughs 1004 refer to the supporting equipment that receive and transmit signals to and from nodes 1002. These signals are transmitted via lines 1006 which refer to fiber cables. Each path used, node, and passthrough has an identifier (e.g., LSVLKYFC for node 1002a) as shown generally in FIG. 11. This graphical information may be useful in assisting engineers for future ring planning or fiber technicians when prioritizing fiber repair work when fiber cables are cut.

The raw data extracted from the X02WDMTABLE procedure 124 may be input to M_FORMATWDM macro 128 at step 230 for producing a WDM Summary report 154 (steps 232-234). A sample WDM Summary report is shown in FIG. 6. The WDM Summary report includes a listing and quantity of working and spare channels serviced by the enterprise executing the database management system 102. Working and spare channels are identified by descriptors such as WDM A and Z locations, WDM types, system identification numbers, and state.

The database management system combines data from disparate systems, such as networking applications, network planning programs, and localized district tables, and creates a database of information to help better forecast and manage fibers, detect routing errors, and resolve issues concerning inter-office facilities data. Threshold flags are set based upon available spare and growth rate that are unique to a particular cross section. The data may be combined with nodes data for generate graphical information for nodes, passthroughs, and lines for any network ring.

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for providing database management services for a telecommunications system, comprising:
    extracting a first set of raw data from a legacy system via a first routine of a network planning application, said first set of raw data relating to telecommunications transmission lines data;
    executing a keystroke emulator on said first set of raw data operable for further extracting details relating to said telecommunications transmission lines data;
    extracting a second set of raw data from said legacy system via a second routine of a network planning application, said second set of raw data relating to telecommunications equipment data;
    extracting a third set of raw data from said legacy system via a third routine of said network planning application, said third set of raw data relating to telecommunications wavelength division multiplexing data;
    utilizing a managed language application, transferring raw data resulting from said executing a keystroke emulator, said second set of raw data, and said third set of raw data to a first spreadsheet application macro, said first spreadsheet application macro operable for merging selected data; and
    generating a first spreadsheet file comprising data selected and combined by said first spreadsheet application macro;
    wherein said first spreadsheet file is a DETCAB worksheet comprising data relating to each physical and virtual fiber, said data including:
        fiber locations;
        a cable number;
        a fiber channel number;
        a WDM channel number;
        a restriction code, if applicable;
        a status code;
    a date a fiber is placed in service; and
        a sonet carrier identifier.

2. The method of claim 1, further comprising:
    utilizing said managed language application, transferring said third set of raw data to a second spreadsheet application macro, said second spreadsheet application macro operable for merging selected data; and
    generating a second spreadsheet file comprising data selected and combined by said second spreadsheet application macro;
        wherein said second spreadsheet file is a WDM SUMMARY file comprising a listing of working and spare channels serviced by an enterprise, said working and spare channels identified by WDM location, WDM type, system identification numbers, and state.

3. The method of claim 1, further comprising:
    utilizing said managed language application, transferring DETCAB worksheet to a third spreadsheet application macro, said third spreadsheet application macro operable for merging selected data; and
    generating a graphical drawing comprising data selected and combined by said third spreadsheet application macro;
    wherein said graphical drawing is a cable ring drawing including fiber routes and telecommunications equipment including a ring of:
        nodes;
        passthroughs; and
        cable lines.

4. The method of claim 1, further comprising:
    importing said DETCAB worksheet to a relational database with built-in queries; and
    based upon a query presented to said relational database, generating a report.

5. The method of claim 1, wherein said first routine is an X02GETCABLE routine.

6. The method of claim 1, wherein said second routine is an X02SCIDSYS routine.

7. The method of claim 1, wherein said third routine is an X02WDMTABLE routine.

8. A storage medium including machine-readable computer program code for providing database management services for a telecommunications system, said storage medium including instructions for causing a server to implement a method comprising:
    extracting a first set of raw data from a legacy system via a first routine of a network planning application, said first set of raw data relating to telecommunications transmission lines data;

executing a keystroke emulator on said first set of raw data operable for further extracting details relating to said telecommunications transmission lines data;

extracting a second set of raw data from said legacy system via a second routine of a network planning application, said second set of raw data relating to telecommunications equipment data;

extracting a third set of raw data from said legacy system via a third routine of said network planning application, said third set of raw data relating to telecommunications wavelength division multiplexing data;

utilizing a managed language application, transferring raw data resulting from said executing a keystroke emulator, said second set of raw data, and said third set of raw data to a first spreadsheet application macro, said first spreadsheet application macro operable for merging selected data; and generating a first spreadsheet file comprising data selected and combined by said first spreadsheet application macro;

wherein said first spreadsheet file is a DETCAB worksheet comprising data relating to each physical fiber and virtual fiber, said data including:
fiber locations;
a fiber channel number;
a cable number;
a WDM channel number;
a restriction code, if applicable;
a status code;
a date a fiber is placed in service; and
a SCID identifier.

9. The storage medium of claim 8, further comprising instructions for causing said server to implement:

utilizing said managed language application, transferring said third set of raw data to a second spreadsheet application macro; and generating a second spreadsheet file comprising data selected and combined by said second spreadsheet application macro;

wherein said second spreadsheet file is a WDM SUMMARY file comprising a listing of working and spare channels serviced by an enterprise, said working and spare channels identified by WDM location, WDM type, system identification numbers, and state.

10. The storage medium of claim 8, further comprising instructions for causing said computer to implement:

utilizing said managed language application, transferring DETCAB worksheet to a third spreadsheet application macro, said third spreadsheet application macro operable for merging selected data; and generating a graphical drawing comprising data selected and combined by said third spreadsheet application macro;

wherein said graphical drawing is a cable ring drawing including fiber routes and telecommunications equipment including a ring of:
nodes;
passthroughs; and
cable lines.

11. The storage medium of claim 8, further comprising instructions for causing said server to implement:

importing said DETCAB worksheet to a relational database with built-in queries; and based upon a query presented to said relational database, generating reports.

12. The storage medium of claim 8, wherein said first routine is an X02GETCABLE routine.

13. The storage medium of claim 8, wherein said second routine is an X02SCIDSYS routine.

14. The storage medium of claim 8, wherein said third routine is an X02WDMTABLE routine.

15. A system for providing database management services for a telecommunications system, comprising:
a server executing:
a legacy system program;
a network planning application including a first routine, a second routine, and a third routine;
a managed language application executing on said server, said managed language program including a first spreadsheet application macro, a second spreadsheet application macro, and a third spreadsheet application macro;
a legacy data repository in communication with said server via a communications network, said legacy data repository storing legacy tables and reports; and
a relational database in communication with said server via said communications network;
wherein said server performs:

extracting a first set of raw data from a legacy system via a first routine of a network planning application, said first set of raw data relating to telecommunications transmission lines data;

executing a keystroke emulator on said first set of raw data operable for further extracting details relating to said telecommunications transmission lines data;

extracting a second set of raw data from said legacy system via a second routine of a network planning application, said second set of raw data relating to telecommunications equipment data;

extracting a third set of raw data from said legacy system via a third routine of said network planning application, said third set of raw data relating to telecommunications wavelength division multiplexing data;

utilizing a managed language application, transferring raw data resulting from said executing a keystroke emulator, said second set of raw data, and said third set of raw data to a first spreadsheet application macro, said first spreadsheet application macro operable for merging selected data; and generating a first spreadsheet file comprising data selected and combined by said first spreadsheet application macro, wherein said first spreadsheet file is a DETCAB worksheet comprising data relating to each physical fiber and virtual fiber, said data including:
fiber locations;
a fiber channel number;
a cable number;
a WDM channel number;
a restriction code, if applicable;
a status code;
a date a fiber is placed in service; and
a SCID identifier.

* * * * *